United States Patent Office 3,070,595
Patented Dec. 25, 1962

3,070,595
PROCESS FOR PRODUCING POLYSULFURIC
ACID ESTERS OF POLYSACCHARIDES
Francis J. Petracek, Canoga Park, and Marshall D. Draper, Woodland Hills, Calif., assignors to Riker Laboratories, Inc., Los Angeles, Calif., a corporation of Delaware
No Drawing. Filed Oct. 28, 1960, Ser. No. 65,591
6 Claims. (Cl. 260—234)

This application is a continuation-in-part of our copending application, Serial No. 755,387, filed August 18, 1958, now Patent No. 3,017,407, granted January 16, 1962.

The present invention relates to processes for preparing substances capable of inducing lipemia-clearing activity.

The present invention relates to a novel process for preparing the lipemia-clearing agents of our said Patent No. 3,017,407 which was granted January 16, 1962, on our said copending application Serial No. 755,387, filed August 18, 1958. It is intended to incorporate the disclosure of the above mentioned patent by reference in its entirety.

An object is to provide novel processes for producing such substances easily, reproducibly, and on a large scale.

Additional objects will be apparent to those skilled in the art from reading the present description.

The antilipemic or lipemia-clearing agents produced in accordance with the process of the invention comprise sulfated polysaccharides selected from the group consisting of corn starch dextrin and corn syrup solids containing an average of between about 5 and 15, and preferably between about 8 and 12, glucose units per molecule, joined predominantly by alpha 1,4 and to a lesser extent by alpha 1,6 linkages, and containing between about 1.5 and 3, preferably between about 2 and 3, sulfate groups per glucose unit. These antilipemic agents are desirably employed in the form of their water-soluble salts of a non-toxic cation. The alkali-metal salts, including the ammonium, potassium and sodium salts, are preferred. The ammonium and potassium salts are preferred where the patient must limit his sodium intake. The antilipemic agents of the invention, having the prescribed degree of polymerization (average number of glucose units per molecule) and number of sulfate groups per glucose unit, provide agents having unusually low toxicity to permit their administration at a clinically useful level and thereby insure satisfactory lipemia-clearing activity, without a concomitant increase in anticoagulant activity.

The average number of glucose units per molecule of the antilipemic agent and the number of sulfate groups each affect the average molecular weight of the product. The molecular weight is also affected by the nature of the cation which provides the salt, the molecular weight being higher for potassium salts than sodium salts. In general, it is preferred to employ antilipemic agents having an average molecular weight of between about 2600 and 6000, with best results obtained between about 3500 and 5500. Below an average molecular weight of 2600, the products tend to have lower antilipemic activity, while above 6000, the products tend to have both lower antilipemic activity and a substantial anticoagulant activity, as well as toxic properties.

In Table 1 below are listed the antilipemic activity (reported in terms of Grossman Units in accordance with the method described in the Journal of Laboratory and Clinical Medicine 43 [1954], 445) and anticoagulant activity (reported in terms of clotting times in accordance with the well-known Lee-White Method) for various potassium salts of antilipemic agents according to the present invention, having various average numbers of glucose units per molecule and various numbers of sulfate groups per glucose unit:

TABLE 1

| Degree of polymerization (average number of glucose units per molecule) | Number of sulfate groups per glucose unit | Antilipemic activity (Grossman Units) | Anticoagulant activity (clotting time in minutes) |
|---|---|---|---|
| 12.8 | 2.48 | 1.07 | 10.5 / 12.0 |
| 8.6 | 2.76 | 4.94 | 10.0 / 10.5 |
| 9.45 | 2.35 | 6.15 | 13.5 / 7.5 |
| 9.40 | 2.23 | 6.60 | 10.0 / 10.0 |
| 6.50 | 2.38 | 1.29 | 8.0 / 9.0 |

In general, the process for producing the antilipemic agents of the invention comprises sulfating a polysaccharide of predetermined average chain length, such as corn starch dextrin or corn syrup solids, containing an average of between about 1 and about 25 glucose units per molecule (preferably between about 5 and 15) with sulfamic acid. It is important that the process of sulfating the polysaccharide starting material be carried out by methods which minimize degradation or depolymerization of the polysaccharide material.

While the polysaccharide or polyglucose starting material or fraction should desirably contain an average of between about 1 and 25 glucose units per molecule, with predominantly alpha-1,4 and alpha-1,6 linkages, an average of between about 8 and 15 glucose units per molecule is preferred. It is desirable that less than 20% by weight of the material have less than about 8 glucose units per molecule and less than about 5% by weight have more than about 25 glucose units per molecule. Below about 8 glucose units, the material merely adds inertness to the final product, while above about 25 glucose units, the material imparts toxicity to the final product.

When employing sulfamic acid as the sulfating agent in combination with an amide reaction medium, it has been found that the sulfamic acid and the amide cannot be warmed together first and the polysaccharide then introduced into the mixture, without resulting in insufficient sulfation and poor yields of final product.

By reason of its being a solid material sulfamic acid is considerably less hazardous and may be much more easily handled than many of the common sulfating agents available. Furthermore, it does not emit noxious fumes as does, for example, chlorosulfonic acid. In addition, we have discovered that degradation or deploymerization of the polysaccharide starting material is minimized and the reaction is more easily controlled when sulfamic acid is employed as the sulfating agent. These advantages plus the ready commercial availability of sulfamic acid make it a most suitable sulfating agent. With sulfamic acid, a reaction medium comprising an amide or substituted amide is desirably used. Among such amides and substituted amides are formamide, dimethylformamide, acetamide and dimethylacetamide, or mixtures thereof. It is preferred to employ dimethylformamide or formamide or mixtures thereof as a reaction medium.

In carrying out the reaction with sulfamic acid as the sulfating agent, the preferred amount of sulfamic acid employed is between 3 and 10 times the weight of polysaccharide.

The molar amount of reaction medium employed is desirably at least approximately equal to the molar amount of the sulfamic acid used.

Polarimetric analysis of polysaccharides has demonstrated that the specific rotation changes and approaches a plateau value at a chain length of approximately eight units. The change in specific rotation is particularly large for the transformation from maltose to glucose (or the corresponding esterified derivatives, including sulfate esters). The esterified derivatives also show a higher specific rotation than the corresponding unesterified compounds. Using maltose as a test polysaccharide it is possible by means of this parameter to determine optimal reaction conditions.

We have found that the temperature during the reaction is preferably maintained at about 75° C. As indicated by specific rotation, the sulfation temperature does not appear to influence the degree of maximum sulfation but does have an effect upon the rapidity with which maximum rotation is reached and the rate at which hydrolysis occurs (shown by rate of decrease in specific rotation). We have also found that extending the duration of the reaction beyond about 1.5 hours, results in a lowering of the specific rotation of the product. Hence it is important to keep the duration of reaction to the minimum to achieve maximum yield of the desired antilipemic product.

It is desirable to employ substantially anhydrous conditions and reagents. When the reaction solvent contains as much as 10% vol./vol. of water, no substantial sulfation is obtained.

By employing as starting materials corn starch dextrin or corn syrup solids which have an average number of glucose units per molecule substantially within the range desired in the final product, the present invention takes advantage of mild reaction conditions to perform the sulfation without depolymerization of the corn starch dextrin or corn syrup solids to any substantial degree. The process provides good yields, great ease of sulfation and prevention of the formation of unwanted dark colored by-products, which have plagued prior art sulfation processes.

Following one particular satisfactory sulfating treatment in accordance with the present invention, the polysaccharide starting material and the reaction medium, such as dimethylformamide, are mixed together and heated to about 55° C. To the warm mixture is added the sulfamic acid and the mixture is then heated to about 70–75° C. for about 1 to 1.5 hours. The mixture is then cooled, methanol added and the solids filtered from the resulting suspension. Desirably, the reaction medium shall contain less than about 1% vol./vol. of water, for at this concentration there is attained some darkening of the product.

By employing corn starch dextrin or corn syrup solids of known molecular size and sulfating the material in accordance with the process of the invention, a means is provided to obtain antilipemic agents being substantially free of toxic properties. That is, of course, an important advantage of the invention since it may be necessary for the patient to take lipemic-clearing agents in substantial and constant amounts over an extended period of time. This minimal toxicity is believed to be in part a result of controlling molecular size and degree of sulfation and in minimizing unwanted degradation products. Since the process of sulfation does not substantially degrade or depolymerize the polysaccharides, the final product is substantially unchanged from the starting material in molecular size. Where the starting material contains an average number of glucose units outside of the 5 to 15 glucose unit range required for the antilipemic agents of the invention, it is necessary to fractionate the product to remove some of the molecules containing less than or more than the prescribed number of glucose units, until the desired average is obtained.

The corn starch dextrin and corn syrup solids employed as starting materials are well-known, commercially available products which are produced to comply with well-defined and consistent specifications. It has been found that 43° Baumé corn syrup solids provide excellent results. These materials provide significant advantages as source materials in the sulfation process of the invention. Because they are available in substantially the molecular weight range desired, they may be sulfated under conditions which cause no further depolymerization which would lower the molecular weight of the final product. Thus greater control of the molecular weight of the final product is made possible. The polysaccharide starting material may be prefractionated as described in Example 4 hereinbelow.

After sulfation, the reaction product may be treated with a suitable precipitant. The precipitant may be an organic liquid in which the salt is insoluble, such as an organic oxygenated solvent miscible with water, including the lower alkanols or acetone. The precipitated salt may be redissolved in water, neutralizing with an alkali and then the alkali salt of the sulfated polysaccharide is precipitated by adding a lower alkanol or acetone or, alternatively, adding an inorganic salt of the alkali, such as potassium chloride.

An alternate means of recovering the reaction product is to add it to water, the quantity of which is calculated to produce a saturated solution of the inorganic salts formed on subsequent neutralization with the calculated quantity of alkali. This results in the separation of the alkali salt of polysaccharide sulfate.

In order more clearly to disclose the nature of the present invention, the following examples illustrating the invention are disclosed. It should be understood, however, that this is done solely by way of example and is intended neither to delineate the scope of the invention nor limit the ambit of the appended claims. In the examples which follow, and throughout the specification, the quantities of materials are expressed in terms of parts by weight, unless otherwise specified.

*Example 1*

100 gms. of the polysaccharide starting material obtained as described in Example 4 hereinbelow, were dissolved in 2.5 liters of dimethyl formamide by heating on a steam bath to about 65° C. 400 gms. of sulfamic acid were added and the mixture stirred with continued heating for 1.5 hours. (Internal temperature of system was maintained at 70° C. for the reaction period.) The reaction mixture was quenched by cooling the reaction mixture to room temperature and adding 1 liter of methanol. The reaction mixture was then cooled. The solids were then filtered off, dissolved in distilled water, titrated to pH 7 with concentrated aqueous ammonium hydroxide and lyophilized to give the dry ammonium salt of the polysaccharide which was then dissolved in 2 liters of distilled water. The resulting aqueous solution was basified to pH 11 with potassium hydroxide pellets and placed in an ice bath for at least 4 hours. The solids were collected by filtration, redissolved in 4 liters of water (requiring heating to 40° C.) and 200 gms. of potassium chloride were added. After standing overnight in an ice bath, the solids were again collected by filtration. The solids were slurried in methanol for 2 hours and again collected by filtration. The product was then air-dried at room temperature and finally dried at 50° C. for 16 hours. The yield was about 250–300 gms. The yield was 93% of material based on weight of starting material, having $[\alpha]_D^{25} = +77.6°$, an average chain length of 10 glucose units per molecule, contained 17.75% sulfur, contained 2.6 sulfate groups per glucose unit and had an antilipemic activity of 4.8±0.8 Grossman units in 25 rats.

*Example 2*

10 gms. of the polysaccharide starting material obtained as described in Example 4 hereinbelow, was heated to a temperature of 74° C. with 20 ml. of formamide until solution was effected. When all the polysaccharide was in solution the temperature was reduced to 62° C. and 36 gm. of sulfamic acid were added with agitation. The mixture was then heated on the oil bath 5 minutes until the temperature reached 82° C., at which time an exothermic reaction appeared to take place. Agitation was continued, the oil bath was removed, and the temperature slowly rose to 118° C. After another 5 minutes the exothermic reaction apparently stopped and the temperature fell. When the temperature was 74° C., 20 ml. of methanol were added to the reaction mixture. The mixture was cooled to 29° C. and an additional 20 ml. of methanol were added. The mixture was filtered and the solid recovered was dissolved in 80 ml. of water. The resulting aqueous solution was basified to pH 13 with 31.9 gm. of potassium hydroxide pellets (85% potassium hydroxide). After 2 hours the pH was changed to 11. The mixture was cooled to 5° C. for 1 hour, the cold mixture was filtered, and the solid added to 160 ml. of water. In order to effect solution it was necessary to add an additional 240 ml. of water and to heat to 35° C. When the solid was all dissolved, 20 gm. of potassium chloride were added and the solution was cooled to 5° C. The solution, containing 5% potassium chloride, was filtered, the solid recovered was slurried with methanol, filtered, washed with methanol and dried at 60° C. in vacuo. The yield was 27.0 gm. of material having $[\alpha]_D^{25} = +83.8°$, an average chain length of 10 glucose units per molecule, 17.8% sulfur, contained 2.6 sulfate groups per glucose unit and had an antilipemic activity of $5.9 \pm 1.2$ Grossman units in 10 rats.

*Example 3*

Formamide (10 ml.), dimethylformamide (40 ml.), and 5 gm. of the polysaccharide starting material, obtained as described in Example 4 hereinbelow, were mixed together. The solution was heated to 70° C., and 18 gm. sulfamic acid were added with stirring. The mixture was heated to 90° C. All the sulfamic acid dissolved. The temperature slowly rose within 10 minutes to 98° C. The mixture was cooled to 29° C., 100 ml. of methanol was added, and the mixture placed in a chamber at a temperature below 0° C. for about 3 hours. The mixture was filtered, the solid recovered was dissolved in 100 ml. of water and the resulting solution was basified to about pH 12 with potassium hydroxide flakes. The mixture was cooled to 5° C. for several hours. Some solid accumulated in the filtrate. The solid was filtered, dissolved in about 5 ml. of water and basified with potassium hydroxide flakes. This mixture was combined with the original potassium hydroxide solution.

The mixture was filtered and the solid recovered was dissolved in 160 ml. of water, 8 gm. of potassium chloride was added and the mixture cooled to 5° C. The potassium chloride mixture was filtered, the solid slurried in methanol, filtered, washed with methanol, air-dried, dried 1 hour at 60° C. in vacuo. The dry weight of product was 11.8 gm. This material had a $[\alpha]_D^{25} = +83.0°$ an average chain length of 10 glucose units per molecule, 17.5% sulfur, contained 2.5 sulfate groups for glucose unit, and an antilipemic activity of $5.7 \pm 0.8$ Grossman units in 10 rats.

*Example 4*

Polysaccharide starting material as employed in Examples 1 through 3 hereinabove was prepared by dissolving 400 gm. of corn syrup solids in 300 ml. of water and adding 100 gm. of pre-washed Solka-Floc® (pure finely divided wood cellulose) (BW-40 white). The resulting slurry was vigorously stirred and 700 ml. of isopropanol added with continued stirring. The slurry was poured on top of a 2¾ inch x 24 inch column of 380 gm. of Solka-Floc® which had previously been washed with a 70:30 mixture of isopropanol to water. The column was then developed and eluted with the same isopropanol-water solution under two pounds of nitrogen pressure. Cuts of 1 liter each were collected from the column. Cuts 16 through 28 were combined and contained polysaccharide material having an average of between about 8 to about 15 glucose units per molecule, and containing less than 20% by weight of material having less than 8 glucose units per molecule and less than 5% by weight of material having more than 25 glucose units per molecule.

*Example 5*

A 170 gram sample of the potassium salt of the sulfated polysaccharide prepared as described in Example 1 was converted to the free acid by passage of 20–25 gm. batches through an ion-exchange column containing 485 gms. of sulfonated polystyrene cation exchange resin (Amberlite IRC–120). Conversion of various batches ranged from 90–100%. Runs showing the best conversion were titrated to pH 7 (about 10–20% excess) with concentrated ammonium hydroxide and lyophilized to give the ammonium salt of the sulfonated polysaccharide. The remainder was reconverted to the potassium salt by titration to pH 7.5 with potassium hydroxide solution, followed by lyophilization. Both the converted salts and the unaltered salt of the sulfated polysaccharide from which they were prepared were tested for antilipemic activity in dogs given molecular equivalent doses. The results of administration to dogs are summarized in the following table.

LIPEMIA-CLEARING ACTIVITY EXPRESSED AS GROSSMAN UNITS

| Drug Given and Dose | No. of Dogs | Time | | | |
|---|---|---|---|---|---|
| | | 0 | 1 Hr. | 3 Hrs. | 5 Hrs. |
| Unaltered Potassium Salt, 250 mg/kg. orally | 5 | 0.0 | 1.8±1.6 | 3.0±1.0 | 2.4±1.2 |
| Converted to Ammonium Salt, 218 mg./kg. orally | 8 | 0.0 | 2.8±0.9 | 4.7±1.0 | 4.7±1.2 |
| Reconverted to Potassium Salt, 250 mg./kg. orally | 8 | 0.0 | 2.2±1.0 | 3.5±0.8 | 3.1±1.0 |

As shown by the results in the foregoing table, the ammonium salt of the invention showed unexpectedly higher anti-lipemic activity over the corresponding potassium salts.

Several important advantages attend the practice of the present invention. First, the cost of manufacture is economical. Secondly, the product and process can be reproduced with considerable accuracy, in contrast to the great variation in products obtained by the processes of the prior art. Thirdly, there is provided greatly improved constancy of product having a satisfactory ratio of therapeutic to toxic dosage.

The toxicity of the products of the invention has been found to be much less than that of sulfated polysaccharides made by the prior art processes from high and intermediate molecular weight materials as measured by Astrup's technique for determining effect on platelet count after injection into rabbits.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of producing a polysulfuric acid ester of a polysaccharide having polyglucose units with predominantly α-1,4 and α-1,6 linkages which comprises treating a polysaccharide selected from the group consisting of corn syrup solids and corn starch dextrin containing an average of about 1 to about 25 glucose units per molecule with sulfamic acid in a substantially anhydrous reaction medium at a temperature between about 70° C. and about 118° C. for between about 1.5 hours and about five minutes, said sulfamic acid being added in an amount of about 3 to about 10 parts by weight per part by weight of said polysaccharide.

2. A process according to claim 1, in which the reaction with sulfamic acid is conducted in the presence of an amide.

3. A process according to claim 2, in which said amide is a member selected from the group consisting of formamide, dimethylformamide and mixtures thereof.

4. A method according to claim 2, in which the reaction is carried out at a temperature between 70° C. and 75° C. for 1.0 to 1.5 hours.

5. A method of preparing an alkali-metal salt of a polysulfuric acid ester of a polysaccharide having polyglucose units with predominantly α-1,4 and α-1,6 linkages which comprises treating a polysaccharide selected from the group consisting of corn syrup solids and corn starch dextrin containing an average of about 1 to about 25 glucose units per molecule with sulfamic acid in a substantially anhydrous reaction medium comprising an amide at a temperature between about 70° C. and about 118° C. for between 1.5 hours and about five minutes, said sulfamic acid being added in an amount of about 3 to about 10 parts by weight per part by weight of said polysaccharide, cooling the reaction mixture, adding a precipitating agent selected from the group consisting of acetone and a lower alkanol, dissolving the precipitate which forms in water and treating the resulting solution with an alkali metal hydroxide thereby to form a solution of said alkali-metal salt.

6. A method according to claim 5, wherein said amide is a member selected from the group consisting of formamide, dimethylformamide and mixtures thereof and said precipitating agent is methanol.

References Cited in the file of this patent

UNITED STATES PATENTS

| | | |
|---|---|---|
| 2,638,469 | Alburn | May 12, 1953 |
| 2,697,093 | Jones | Dec. 14, 1954 |
| 2,755,275 | Cushing et al. | July 17, 1956 |
| 2,786,833 | Wurzburg et al. | Mar. 26, 1957 |